United States Patent
Kleijn et al.

(10) Patent No.: US 8,325,279 B2
(45) Date of Patent: Dec. 4, 2012

(54) FLICKER SUPPRESSION

(75) Inventors: Willem Bastiaan Kleijn, Stocksund (SE); Bjoern Volcker, Bromma (SE)

(73) Assignee: Google Inc., Mountain View, CA (US)

( * ) Notice: Subject to any disclaimer, the term of this patent is extended or adjusted under 35 U.S.C. 154(b) by 605 days.

(21) Appl. No.: 12/552,004

(22) Filed: Sep. 1, 2009

(65) Prior Publication Data

US 2011/0050997 A1    Mar. 3, 2011

(51) Int. Cl.
*H04N 5/00* (2006.01)
*H04N 7/00* (2006.01)
*H04N 11/00* (2006.01)
*G06K 9/00* (2006.01)
*G09G 5/02* (2006.01)

(52) U.S. Cl. ........ 348/607; 348/479; 382/168; 382/169; 345/595

(58) Field of Classification Search ........................ None
See application file for complete search history.

(56) References Cited

U.S. PATENT DOCUMENTS

| | | | |
|---|---|---|---|
| 5,727,080 A | 3/1998 | Cox et al. | |
| 5,793,886 A * | 8/1998 | Cok | 382/169 |
| 7,218,777 B2 * | 5/2007 | Asano et al. | 382/168 |
| 2005/0018920 A1 | 1/2005 | Ramamurthy | |
| 2010/0053199 A1 * | 3/2010 | Robert et al. | 345/595 |

OTHER PUBLICATIONS

Naranjo, V. et al. "Flicker reduction in old films." Image Processing, 2000. Proceedings 2000 International Conference, Sep. 10-13, 2000, IEEE, Piscataway, NJ, USA. vol. 2, pp. 657-659. ISBN 978-0-7803-6297-0.
European Search report for EP Application No. 09175939.9 dated Nov. 3, 2010.
Patent Cooperation Treaty International Search Report for International Application No. PCT/EP2010/062717 mailed Nov. 3, 2010.
Naranjo et al., "Flicker Reduction in Old Films," 2000 IEEE, pp. 657-659.

* cited by examiner

*Primary Examiner* — Jefferey Harold
*Assistant Examiner* — Sean Haiem
(74) *Attorney, Agent, or Firm* — Young Basile Hanlon & MacFarlane P.C.

(57) ABSTRACT

The invention relates to a method, device and computer-program product for suppression of undesired temporal variations, notably flicker, in a sequence of video frames. Histogram-based and similar approaches generally do not remove all flicker. Features that are resolved only in portions of the flicker cycle will manifest themselves as residual flicker. This effect is near-universal in bright regions of a scene. The inventive solution is a mapping that aims to resolve in the output only those features that are resolved in all frames of the flicker cycle. Use of time-maximal quantile values may preserve non-resolution of such image features that are unresolved due to intermittent bright saturation. Thus, in one embodiment, a reduction of resolution is attained by means of a pixel-value mapping based on selecting, over a time window, maximal and minimal quantile values, with maximal values being used for bright spatial regions and minimal values for dark spatial regions.

20 Claims, 4 Drawing Sheets

FLICKER SUPPRESSION

TECHNICAL FIELD

The invention disclosed herein generally relates to video processing, and more precisely relates to suppression of undesired temporal variations in a sequence of video frames. Temporal brightness variations commonly result from aliasing in the imaging apparatus. The invention is well suited for the suppression of undesired temporal variations in the brightness of the video image.

BACKGROUND

During playback of moving images—that is, the sequential presentation at appropriate points in time of a series of still images (frames)—a viewer may sometimes observe an undesired brightness variation, 'flicker', which was not present in the depicted scene. Flicker may be caused by a light source having intensity oscillations that are fast enough to be imperceptible to the human eye. However, the recording includes sampling, at the frame rate of the imaging apparatus, of this oscillation frequency, which may give rise to a lower, visibly perceptible frequency through the process of sampling. FIG. 1 illustrates how samples (shown as circles) of a high-frequency signal can be interpreted as coming from a low-frequency signal and vice versa; this phenomenon is referred to as aliasing.

One may distinguish different kinds of flicker. In a grayscale video sequence, flicker is an unintentional—and usually periodic—variation of the single channel of the image signal. Such variation may affect the whole frame or only a subregion, which may correspond to a region of space having a particular illumination. When color video technology is used, an oscillating white light source may affect the recorded video sequence in a different way than an oscillating colored light source. As will be explained in the next few paragraphs, the precise interpretation of flicker in terms of image components depends on the precise color video format used.

Firstly, if the video sequence is encoded in terms of linear primary color components, such as RGB, the undesired oscillation will be present in all components in the case of a white light source. If the oscillating light source is colored, it will contribute an oscillating term to each color component in proportion to the composition of the color of the light source; for example, an oscillating red light source will contribute predominantly to the R component of an RGB signal and less to the G and B components.

Secondly, several widespread color video formats are based on a three-dimensional YCbCr color space. Such a video format comprises one luma channel Y (encoding the luminance component, or brightness, of a pixel) and two chroma channels Cb, Cr (encoding the chrominance components of a pixel in terms of the deviation from white). The precise definition of the image components (as regards constants, scaling, offset etc.) may vary between different particular video formats, but generally there exists an unambiguous transformation (sometimes a linear transformation) between a primary color format and a YCbCr format.

Thirdly, there exist further color video formats based on the triple of hue, saturation and lightness, notably the HSL, HSV, HLS, HIS and HSB formats. Generally, a transformation to and from the RGB format accompanies each video format of this kind. Flicker, at least white flicker, will be detectable in the lightness/value/brightness/intensity channel (L or V), which will not be distinguished from luminance in the rest of this disclosure.

The discussion in the previous paragraphs intentionally does not distinguish between analogue and digital formats since, for the purposes of this disclosure, the latter may be regarded as quantized versions of the former. Likewise, some video formats may exist in gamma-compressed or partially gamma-compressed version, such as the R'G'B' and the Y'CbCr formats, in addition to the linear version. However, it is immaterial for the understanding of the present invention whether the video format includes such compression.

Because viewers may find flicker disturbing or unpleasant, there has been an interest in the field of video processing in correcting it. Several available methods for suppressing or removing flicker are based on correction of each frame in a flickering sequence against a reference frame. More precisely, a cumulative distribution function (CDF) or, by another name, a cumulative histogram is generated for the frame to be corrected and a reference CDF is generated for the reference frame. The pixel values are then adjusted in order that the CDF for the corrected frame is approximately equal to that of the reference frame. In general, it is not necessary for the reference frame to be identical (apart from the brightening or darkening caused by flicker) to the frame to be corrected, but it should preferably depict a similar scene with respect to background, lighting, etc. Furthermore, there are known methods which use histograms rather than cumulative histograms.

Flicker correction by (cumulative) histogram methods often leaves artifacts that are generally most noticeable in bright spatial regions of the image. Frames at one stage of the flicker cycle may resolve image features that are not resolved in frames in another stage of the flicker cycle. Such residual flicker is a severe disadvantage of conventional methods based on cumulative histograms. The same effect also occurs in conventional histogram-based methods.

SUMMARY

In view of the drawbacks of available technology for suppressing undesired temporal variations, it is an object of the present invention to provide an alternative technique for the suppression of such variations, which suffers to a lesser extent from these drawbacks. Importantly, the invention aims to produce a suppression device and method adapted to output a corrected video sequence, in which all frames resolve the same set of image features. In other words, by applying the present invention, it can be avoided that certain image features are resolved in some frames but not in others.

As defined by the independent claims, the invention provides a method, a computer-program product and a device for suppressing undesired temporal variations, and flicker in particular. In a first aspect of the invention, a method for suppressing an undesired temporal pixel-value variation in a time sequence of video frames includes:

- computing, on the basis of values of a predetermined subset of pixels in each video frame in the time sequence, a set of number pairs of cumulative probabilities and corresponding quantiles, thereby yielding a sequence of sets of number pairs;
- determining, on the basis of the sequence of sets of number pairs, guidance number pairs of cumulative probabilities and corresponding quantiles; and
- replacing actual pixel values in the most recent frame in the time sequence by corrected pixel values in accordance with the set of guidance number pairs.

Here, the guidance number pairs are determined in such manner that the occurrence of one or more image features, which are resolved in a first other frame in the time sequence and are unresolved in a second other frame of the time sequence, causes quantiles of two or more guidance number pairs to substantially coincide, with the purpose of not resolving one or more image features after the step of replacing actual pixel values.

As used herein, a quantile, or P-quantile, is a value that cuts off a lower subset of the observations of a random variable. The size of the subset is such that the probability of obtaining a sample below the P-quantile is P. The quantiles can be viewed as values of a quantile function q of the probability P (further, q depends parametrically on the actual distribution of the random variable), that is, $$q=q(P), 0 \leq P \leq 1.$$

Hence, q(0) and q(1) are the minimal and maximal values, respectively, of the random variable. Clearly, the quantile function is non-decreasing. With this understanding, considering the pixel values in a frame as observations of a random variable, the number pairs computed in the first step are of the form (P, q(P)), where P denotes cumulative probability.

A flicker cycle is the time interval between two time instants that correspond to the same phase of a periodic pixel-value variation, flicker. In practice, it can be defined as the time duration between the two nearest identifiable pixel-value maxima in a periodic sequence of such identifiable maxima. The inventive idea provides good suppression of flicker. Importantly, the invention aims to resolve in the output only those image features that are resolved in all frames over the interval of a flicker cycle. Thus, residual flicker is prevented.

In one embodiment of the invention, coincidence of quantiles of two or more guidance number pairs may occur when said first and second other frames are located within the same flicker cycle as the most recent frame.

In another embodiment, the set of guidance number pairs and each set of number pairs are matched with respect to cumulative probability. In other words, the number pairs for a first image frame F1, which are computed in the first step of the method, may be written:

$$(P_1, q_{F1}((P_1)), (P_2, q_{F1}(P_2)), (P_3, q_{F1}(P_3)), \ldots$$

where $q_{F1}$ depends parametrically on the pixel-value distribution in the predetermined subset of pixels. Thus the quantiles, referred to as basic quantiles, characterize the pixel values of the subset. Advantageously, the subset is selected by a regular sub-sampling of the frame. For a second image frame F2, the number pairs may be:

$$(P_1, q_{F2}(P_1)), (P_2, q_{F2}(P_2)), (P_3, q_{F2}(P_3)), \ldots$$

That is, the $P_1$-quantile, the $P_2$-quantile etc. are evaluated for the pixel values of the different image frames.

In an alternative embodiment, the number pairs are matched with respect to quantiles, namely:

$$(p(Q_1), Q_1), (p(Q_2), Q_2), (p(Q_3), Q_3), \ldots$$

In other words, the cumulative probabilities $p(Q_1)$, $p(Q_2)$, $p(Q_3)$, ... for a set of fixed pixel values $Q_1, Q_2, Q_3, \ldots$ are computed, and the set of number pairs are a discrete approximation of the cumulative distribution function of the pixel values. Hence, as noted above, this embodiment uses number pairs that are matched to the guidance number pairs with respect to the cumulative probability.

In the second step of the method, guidance number pairs are determined:

$$(P_1, Q_1), (P_2, Q_2), (P_3, Q_3), \ldots$$

where the first number in each pair matches the cumulative probability in corresponding number pairs computed in the first step. The second numbers $Q_1, Q_2, Q_3, \ldots$—the desired quantiles—are related to the distribution of corrected pixel values after the replacement which is performed in the third step of the method.

In an advantageous embodiment, the replacement of pixel values preserves the relative relationship of the pixel vales. The set of number pairs, evaluated for the most recent frame, describe the actual pixel values to be replaced, while the guidance number pairs describe the matching corrected pixel values. More precisely, if the pixel values are regarded as observations of a stochastic variable, the quantiles of the number pairs refer to the distribution of the pixel values and the quantiles of the guidance number pairs refer to the distribution of the corrected pixel values. Thus, for instance, the $P_1$-quantile, $q(P_1)$, is mapped to the guidance $P_1$-quantile, $Q_1$.

In another embodiment, the step of replacing is carried out in accordance with a monotone mapping, which associates a corrected pixel value to each actual pixel value. The cardinality of the set of guidance number pairs need not be that of the full set of pixel values. Rounding of the actual pixel value to determine the nearest quantile for which a matching guidance pair exists may need to be performed. By the monotonicity, $Q_1 \leq Q_2$ if $q(P_1) \leq q(P_2)$. The mapping is such that each pixel value for the most recent frame is mapped to a quantile of a matching guidance number pair.

In yet another embodiment, the mapping from actual to corrected pixel values includes interpolation of values lying between the quantiles forming the set of guidance number pairs. More precisely, any quantile comprised between quantiles of two adjacent number pairs is mapped to a value obtained by interpolation between quantiles of guidance number pairs that match these number pairs.

In still another embodiment, the coincidence of quantiles belonging to two or more guidance number pairs occurs responsive to the same quantiles coinciding in any of the sets of number pairs. This advantage can be better understood by realizing that a coincidence of quantiles may indicate that certain image features are not resolved. E.g., if $q(P_1)=q(P_2)$ even though $P_1 \neq P_2$. It is noted, in view of imperfections of the human eye, that the quantiles need not be exactly equal for an image feature to be practically unresolved.

This situation may occur in an image frame that has been brightened by luminance flicker, in which case $q(P_1)$ is the maximal admissible pixel value, to which saturated pixels are truncated down; the probabilities $P_1, P_2$ are then located at the high end of the range of probabilities, that is, near 1. Resolution effects may give rise to a similar phenomenon. However, the same flicker cycle may contain a frame that has not been equally brightened and the $P_1$-quantile is not the maximal admissible pixel value; at least some of the image features between the $P_1$-quantile and the maximal admissible value are resolved in this frame. Thus, these image features disappear and reappear during a flicker cycle, and this artifact is perceived as residual flicker. By preserving quantile coincidences having occurred in any of the sets of number pairs, this embodiment of the invention prevents such residual flicker.

In particular embodiments of the invention the guidance number pairs contain desired quantiles which are either minima, medians, averages or maxima of the quantiles of matching number pairs in the sequence. Advantageously, the method is performed in a 'running' fashion, so that the minima, medians, averages, or maxima are quantities determined with respect to sliding time windows.

Advantageously, some guidance number pairs contain desired quantiles obtained as maxima (bright quantiles), while other guidance number pairs contain desired quantiles obtained as medians, averages or minima (dark quantiles).

Preferably, the dark quantiles are used for dark pixel values, in which range they provide a reduced resolution and thus a decrease of the flicker level, and the bright quantiles are used for bright pixel values, in which range they have a similar effect as the dark quantiles. It has been observed experimentally that the temporal flicker of the dark quantiles is significantly less than the temporal flicker of the basic quantiles, and this effect is even more pronounced for bright pixels. However, dark quantiles may suffer from residual flicker in bright image regions, as bright quantiles may be affected by residual flicker in dark image regions. Thus, some guidance number pairs may also contain desired quantiles obtained by combining (interpolating) bright and dark quantiles, as will be detailed below.

In another embodiment of the invention, the number pairs are computed on the basis of a proper subset of the pixels in the video frames. The subset is selected in order to be representative and to provide a sufficient accuracy. It can be selected by sub-sampling the frame.

In a second aspect of the invention, there is provided an apparatus for suppressing undesired temporal variations in a sequence of video frames. The apparatus comprises:
a first processing means for computing, on the basis of values of a predetermined subset of pixels in each video frame in the time sequence, a set of number pairs of cumulative probabilities and corresponding quantiles, thereby yielding a sequence of sets of number pairs;
a buffer for storing the sequence of sets of number pairs;
a second processing means for determining, on the basis of the sequence of sets of number pairs, a set of guidance number pairs of cumulative probabilities and corresponding quantiles; and
a corrector for replacing actual pixel values in the most recent frame in the time sequence by corrected pixel values in accordance with the set of guidance number pairs, thereby yielding a corrected video frame,
wherein quantiles of two or more guidance number pairs coincide, with the purpose of not resolving one or more image features after the step of replacing actual pixel values, responsive to the one or more image feature being resolved in a first other frame in the time sequence and unresolved in a second other frame of the time sequence.

BRIEF DESCRIPTION OF THE DRAWINGS

The invention will now be further elucidated with reference to the accompanying drawings, on which.

DETAILED DESCRIPTION OF EMBODIMENTS

Particular embodiments of the present invention will now be described. The invention may, however, be embodied in many different forms and should not be construed as being limited to the embodiments set forth herein; rather, these embodiments are provided by way of example so that this disclosure will be thorough and complete, and will fully convey the scope of the invention to those skilled in the art.

Figure 4:
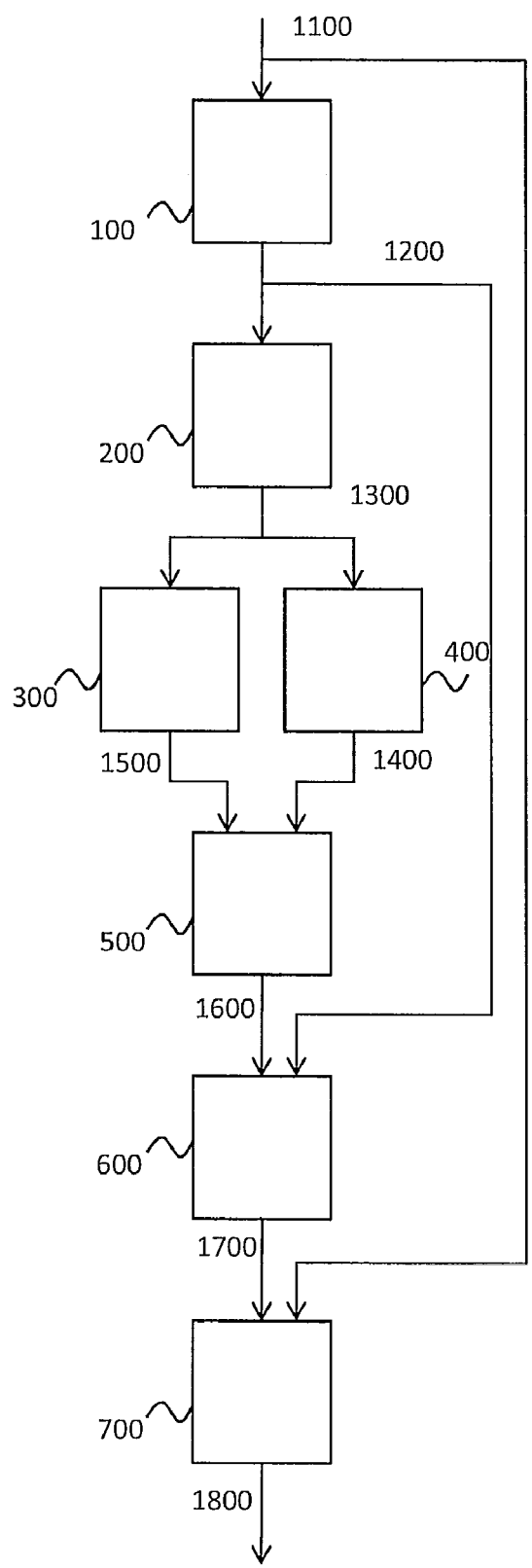
FIG. 4 is a schematic drawing of a device for correction of undesired temporal variations in a sequence of video images, according to an embodiment of the invention.

FIG. 4 is a diagrammatic drawing of a device for suppression of undesired temporal variations in a video frame sequence. Generally, the functional sections (represented by rectangles in FIG. 4) do not necessarily refer to physically separate entities; at least some of the functional sections may be combined into multi-functional sections, or may even be embodied as computer-executable instructions.

To provide insight into the purpose of the functional sections in FIG. 4, a high-level description of the system is provided before a sequential description of the operations described in FIG. 4.

The input to the system in FIG. 4 is a sequence 1100 of frames (a first video signal), which may suffer from flicker.

The sequence corresponds to a time-domain sampling of the observed scene, each time-domain sample of the video signal consisting of a set of pixel values (or vectors) that represent a spatial sampling of the scene. The output is a second sequence of frames (a second video signal) 1800, where the flicker is essentially removed. In the following, it is assumed that the pixel value is a scalar representing luminance. However, it is understood that the input can be a vector of any dimension describing the color and intensity of the pixel in a particular format. The operations can then be performed for each component separately.

For the purpose of this description it is defined, in addition to flicker cycle (see above), the term current flicker interval. A current flicker interval refers to a time interval that includes one flicker cycle that includes the current time instant. The precise duration of the flicker interval is not critical, but it is advantageously sufficiently long to include the maximum expected duration of the flicker cycle and sufficiently short to not be biased by intentional scene changes. As an example, for a 30-frames-per-second video recording and a 50-Hz lighting system, the current flicker interval is set to seven times the time sampling interval.

To reduce the flickering, the system of FIG. 4 computes a mapping 1700 that assigns an output pixel value to each possible input pixel value. The actual mapping for each pixel is executed in a mapping operator 700. The result of the pixel-by-pixel mapping is that the sequence 1100 of video frames (the first video signal) is mapped to the second video signal 1800.

The mapping 1700 is based on knowledge of a set of desired values 1600 of each of the quantiles. The desired quantiles together with the corresponding cumulative probabilities form the guidance number pairs. Importantly, even if the desired quantiles do not vary over time, the output from the pixel mapping operator 700—i.e., the corrected frames—may contain residual flicker due to saturation or resolution effects. Consider a video-signal frame F1 and a video-signal frame F2. Now consider a set of pixels with identical luminance values in frame F1. This set of pixels may not have identical values in frame F2, that is, frame F2 may resolve image features that are not visible in frame F1. In a common example of this effect, the pixels are saturated in frame F1 but not in frame F2. The mapping operator 700 then outputs a flickering image as certain features are resolved at some times (of which frame F2 is an example) and not at other times (of which frame F1 is an example). Therefore, a major objective of the device shown in FIG. 4 is to resolve in the output 1800 only those features that are resolved in all frames of sequence 1100 over an interval of duration somewhat larger than the current flicker cycle.

Figure 3:
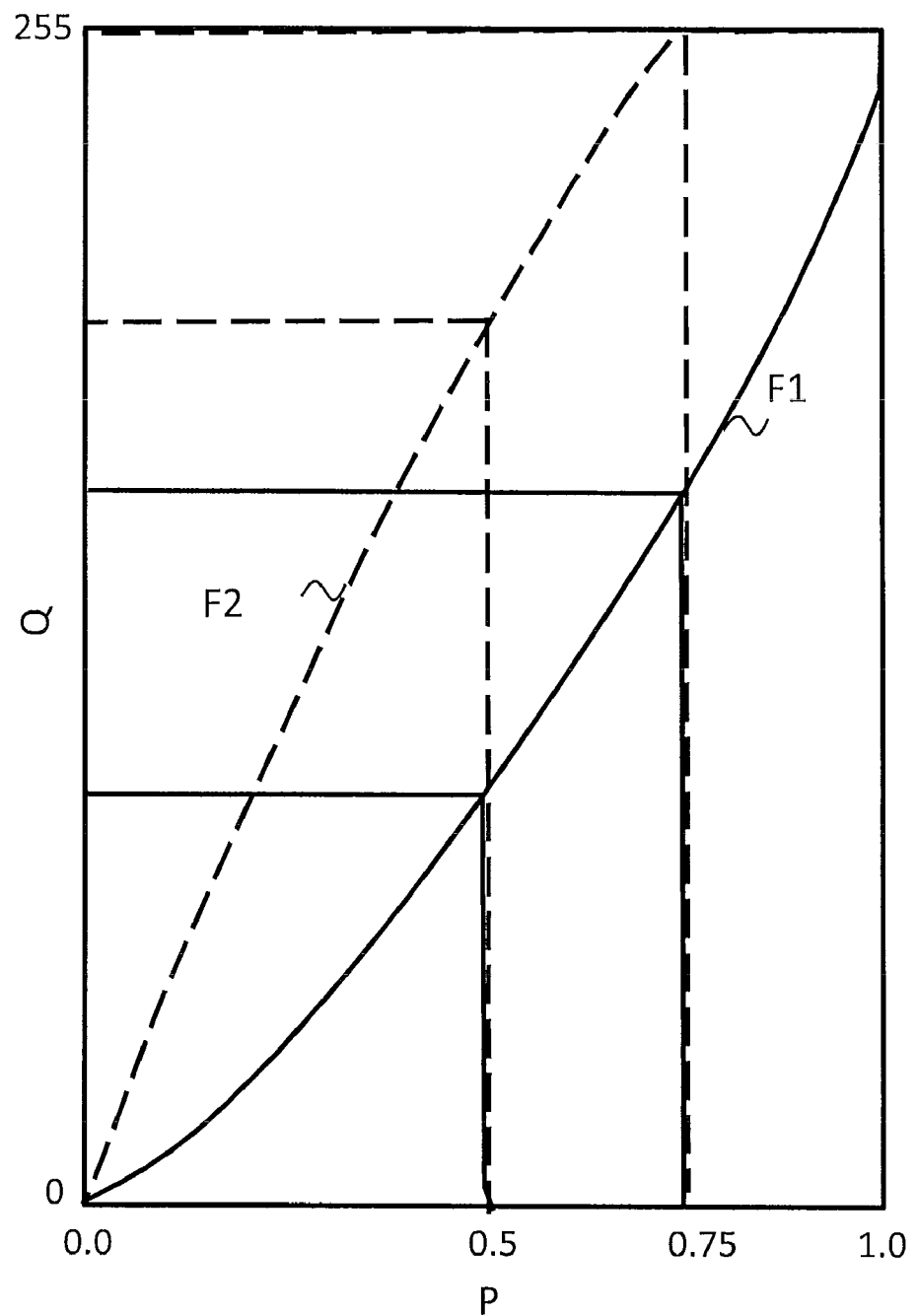
FIG. 3 illustrates quantiles for two frames of a flicker cycle; the quantiles for the cumulative probabilities 0.5 and 0.75 are shown explicitly for each frame.

To avoid ambiguity it is noted that quantiles are effectively a function of cumulative probability (in this embodiment, the quantiles are evaluated for a set of fixed cumulative probability values) and that "not resolving image features" is equivalent to the quantile value being constant over the range of cumulative probabilities in which such image features are displayed. This is illustrated in FIG. 3 for the exemplary frames F1 (solid line) and F2 (dashed line). It is seen that the quantile function of cumulative probability is constant for frame F2 for cumulative probabilities between 0.75 and 1.0. This corresponds to saturation of bright spatial regions in the image.

Importantly, the present invention requires knowledge only of a subset of quantiles and not of an entire curve of the type displayed in FIG. 3.

The mapping 700 is constructed from corresponding sets of desired quantiles and input-frame quantiles—herein referred to as basic quantiles—for a frame. The basic quantiles and their corresponding quantiles form the number pairs. If an input value corresponds to a particular basic quantile from the set, then the output value is the corresponding particular desired quantile. Let $Q_{basic}$ and $Q_{desir}$ denote the set of basic and desired quantiles for a predefined set of cumulative probabilities. A mapping $v: Q_{basic} \to Q_{desir}$ can then be written as:

$$q_{desir} = v(q_{basic}), q_{basic} \in Q_{basic}, \quad (1)$$

where $q_{basic}$ and $q_{desir}$ are the basic and desired quantiles, respectively. Note that the quantile $q_{basic}$ is a function of the cumulative probability P, i.e. $q_{basic} = q_{basic}(P)$, where $q_{basic}$ denotes a function. Advantageously, $Q_{basic}$ is the image under $q_{basic}$ of a set of 12 cumulative probabilities, $$P^* = \{0.05, 0.1, 0.2, 0.3, 0.4, 0.5, 0.6, 0.7, 0.8, 0.9, 0.95, 0.98\}.$$

Thus, $Q_{basic} = q_{basic}(P^*)$. Smaller and larger sets can also be used, with smaller sets generally requiring a lower computational effort.

If the set of basic quantiles $Q_{basic}$ contained all possible values of luminance, then the input-output mapping would be complete. In practice, it is possible to construct the mapping 700 from a small set of basic and desired quantile pairs, such as those pairs specified by the 12 cumulative probabilities in the set P*, and by assuming that the mapping 700 is monotone. The remaining parts of the mapping can be found by interpolation between the values obtained with the function v of equation (1) for the input values $q_{basic} \in Q_{basic}$ and subsequent rounding off to a suitable set of integer values.

Advantageously, linear interpolation is used. Let Q represent the finite set of discrete pixel values (in 8-bit coding, $Q = \{0, 1, \ldots, 255\}$) then a mapping $w_{desir}: Q \to Q$ can be written as:

$$q_{desir} = w_{desir}(q_{basic}), q_{basic} \in Q.$$

As mentioned above, the invention aims to remedy the fact that the mapping constructed in the above manner does not resolve image features that are resolved in other frames of the current flicker interval. It is noted that the input has the same discrete scale and the same finite range as the output. Furthermore, the basic quantiles are a property of the input frame and, therefore, fixed. The goal of not resolving image features must therefore be reached by changing the output levels, i.e., the desired quantiles. Consider the quantile function q(P). Not resolving image features means that the corresponding quantiles are constant as a function of the cumulative probability P in a particular range of P, i.e.:

$$q(P) = \text{constant}, P_0 \leq P \leq P_1,$$

where $P_0$ and $P_1$ specify the boundaries of the range.

There is a fixed number of input levels in Q and the same number of output levels at most (two input levels may be mapped to the same output level). Hence, the presence of constant-quantile intervals (corresponding to constant-quantile regions in the image) in some frames imply that the goal of not resolving image features is reachable only if the number of levels used of the output scale is made lower, in other frames of the flicker cycle, than that of the input scale. Thus, not resolving image features, the reduction of resolution, in a certain cumulative probability range comes at the price of either a coarser description of the desired quantiles for other quantile ranges, or of a reduction in the dynamic range. Clearly both effects are undesirable and the reduction in resolution should be minimized. Generally it is desirable to have an image with a large dynamic range so that, advantageously, the option of increasing the coarseness of the desired-quantile scale is selected.

While the non-resolving of image features can occur for any quantile range, it most commonly happens near the ends of the pixel-value scale. That is, for reasons of truncation, very dark features and/or very bright features are commonly not resolved in some frames of the current flicker interval.

The above overview discusses the operation of the function sections of the system illustrated in FIG. 4. Below follows a step-by-step description of the same system.

For each frame, basic-quantiles computer 100 computes a set of quantiles. Depending on the resolution of the image and on the quality required, the quantiles can be based on all pixels of the frame or on a subset of pixels based on a spatial sub-sampling of the pixels. Advantageously a regular sub-sampling by an integer number can be used for this purpose. The quantiles can be estimated with any of the many well-known methods. For example the quantiles can be computed by sorting the pixel values and selecting the pixel value corresponding to the M'th value of the sorted set such that:

$$M = M(P) = \text{round}(N^*P),$$

where P is the cumulative distribution value of the quantile and N is the number of pixels used for the estimation of the quantile. Let the output of the function x(t,M) represent the M'th value of the sorted set at sampling time t, then the basic quantile at time t can be estimated from the frame pixel values as $$q_{basic}(t,P) = x(t, M(P)),$$

where $q_{basic}(t,P)$ is a function that maps the cumulative distribution value P and sampling time t onto the basic-quantile value, Many other methods exist to estimate the basic quantiles directly, some of which do not require the computation of the cumulative distribution function.

Figure 1:
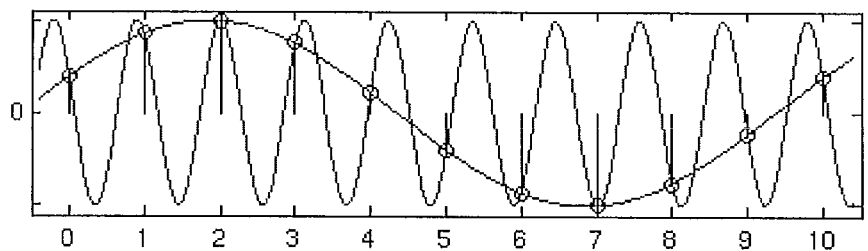
FIG. 1 illustrates frequency aliasing.
Figure 2:
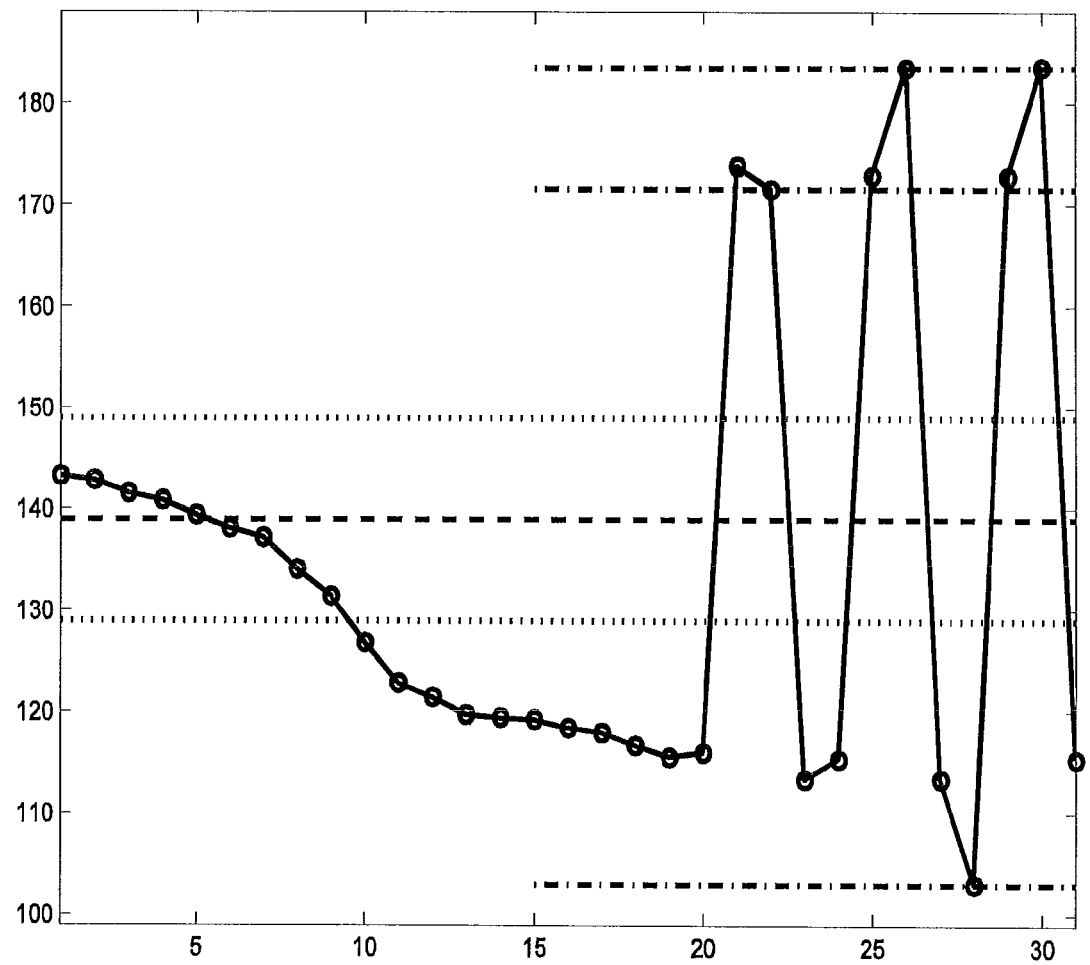
FIG. 2 is a graphical representation of an oscillating sequence of frame-wise means of pixel values.

The flicker of a sequence of images can be observed directly in the basic quantiles, without further use of the frame pixels. That is, the time variation of $q_{basic}(t,P)$, with P chosen suitably, will indicate flicker in the image. As an alternative, consecutive frame-wise means of the pixel values can be monitored for oscillations; cf. FIG. 2 in which flicker occurs from the 20$^{th}$ frame and onwards. Moreover, the quantiles directly provide information about whether the corresponding image is bright or dark. This is a convenient aspect of using quantiles for the analysis of flicker. This information is not conveniently available in the cumulative distribution function.

Consecutive sets of basic quantiles are stored in a buffer 200 for a finite time duration, a sliding time window. Advantageously, the sliding window has a length of at least one cycle of the flicker. It is natural to set the length of the sliding time window to that of the current flicker interval defined above.

The stored sets of basic quantiles are processed in both bright-quantile computer 300 and dark-quantile computer 400. As will be seen below, the use of two types of processing facilitates the elimination of resolution of certain image features.

The bright-quantile computer 300 computes the time maximum over the sliding time window for a subset of the basic quantiles, that is, $$q_{bright}(t, P) = \max_{t-\frac{T}{2} < s \leq t+\frac{T}{2}} q_{basic}(s, P)$$

where T is the length of the sliding time window (s being a discrete quantity) and $P \in P' \subset P^*$. Advantageously, the subset is selected to be all the basic quantiles, i.e., $P'=P^*$. The output of 300 then consists of sets of time-maximum quantiles, one set for each time sample (frame) of the video signal. This set of outputs are referred to as the bright quantiles for the sliding window. Usually, but not necessarily, the output of 300 is the set of quantiles of the brightest frame of the set of frames corresponding to the sliding window. If the sliding window is at least as long as one cycle of the flicker, then the bright quantiles display little flickering.

It is noted that the output of bright-quantile computer 300 can be, as an alternative, the second brightest time value of the basic quantile, the average of the two brightest time values of a basic quantiles, or another similar indicator that numerically characterizes the temporal peak of a basic quantile over the sliding time window. Such indicators may be selected because they have the advantage of a smaller estimation error than a simple maximum. The estimation error ultimately results in a jitter in the brightness level. It is understood that 'maximum', in this context, may refer to any such indicator.

An important motivation for the invention is that pixels belonging to the bright quantiles do not resolve image features that are saturated and, therefore, not resolved in at least one frame of the current flicker interval. In the case of bright saturation, the maximum of one or more bright quantiles will then be equal to the maximal admissible value, max Q. As the 1.0-quantile equals max Q by definition, saturation can be described as a coincidence of this quantile and the next highest one, such as the 0.98-quantile; if the saturation is severe, there may be even more coinciding quantiles. In practice, this means that the main source of residual flicker is removed when the mapping 1700 is based on the bright quantiles.

The dynamic range of the image corresponding to the bright quantiles is usually reduced from that of the input frame at the same time sample. If the bright quantiles were used as desired quantiles, the resulting output video signal would in general be overly bright. This is one reason why a satisfactory deflickering algorithm cannot be based on the set of bright quantiles alone.

The dark-quantile computer 400 computes the minimum of a subset of the quantiles, each drawn from the frames of basic-quantiles within the sliding window. Its operation is similar to that of the bright-quantile computer 300.

Alternatively, and without a strong effect on the final outcome of the method, the dark-quantile computer 400 can compute the time median of each quantile:

$$q_{dark}(t, P) = \operatorname*{median}_{t-\frac{T}{2} < s \leq t+\frac{T}{2}} q_{basic}(s, P), \quad P \in P',$$

(for clarity it is emphasized that, with this definition, $q_{dark}$ (0.50) is the time median of the sequence of pixel-value medians) or the temporal minimum of each quantile:

$$q_{dark}(t, P) = \min_{t-\frac{T}{2} < s \leq t+\frac{T}{2}} q_{basic}(s, P), \quad P \in P'.$$

As an alternative, the dark-quantile computer 400 could compute the temporal average of the quantiles, $$q_{dark}(t, P) = \frac{1}{T} \sum_{s=t-\frac{T}{2}+1}^{t+\frac{T}{2}} q_{basic}(s, P), \quad P \in P',$$

T being the length of the discrete, sliding time window, or other similar quantities useful as indicators, such as the minimum over the sliding time window. As with the bright quantiles, the skilled person may effectuate variations beyond to the formulas above when devising the computation of the dark quantiles. In this process, the minimization of the associated estimation error may be used as a guiding principle in addition to routine experimentation.

Like the bright quantiles, the dark quantiles generally do not suffer from flicker. However, if the dark quantiles are used for constructing the mapping 1700, the corrected image may either be too dark (if the minima over the sliding time window are used as dark quantiles) or have about the right level of brightness (if the medians or averages are used as dark quantiles). However, the dark quantiles generally resolve image features that are saturated and, thus, not resolved in at least one frame of the flicker interval. This means that if the set of dark quantiles is used as the set of desired quantiles, then a residual flicker generally remains for bright image features. On the other hand, if the minimum estimator is used, then the dark quantiles do not resolve features that are not resolved in some of the frames of the current flicker interval because their luminance value falls to zero. This means that the dark quantiles remove residual flicker in dark spatial regions. It should be noted, however, that some residual flicker in dark spatial regions generally is not perceptually annoying.

The outputs of the bright-quantile computer 300 and dark-quantile computer 400 are a set of bright quantiles and a set of dark quantiles for each sampling time t. Neither set itself suffers from temporal flicker but applying correction based on one of them would either lead to an overly bright or too dark image. If used as desired quantiles, bright quantiles may result in residual flicker in dark spatial regions, and dark quantiles may result in residual flicker in bright spatial regions.

To remedy this problem, a desired-quantile computer 500 combines the bright quantiles and the dark quantiles to provide a set of desired quantiles 1600 which do not resolve features for high and low brightness, and which have a coarser resolution in the middle pixel-value range. Let $w_{dark}$: $Q \rightarrow Q$ denote a function that maps the set of discrete pixel values onto itself and has the property of mapping each basic quantile to the corresponding dark quantile:

$$w_{dark}(q_{basic}(t,P)) = q_{dark}(t,P), P \in P^*.$$

Similarly, let $w_{bright}$: Q→Q denote a function that maps each basic quantile to the corresponding bright quantile. Both functions are obtained by linear interpolation, which extends their domains from $Q_{basic}$ to Q in a manner similar to that described above for $w_{desir}$: Q→Q. Furthermore, let $q_{desir}$ be the desired quantile value. Then, for each quantile, the corresponding desired quantile is constructed as follows:

$$q_{desir} = (1 - \alpha(q_{basic}))w_{dark}(q_{basic}) + \alpha(q_{basic})w_{bright}(q_{basic}), \quad (2a)$$
$$0 \leq q_{basic} \leq q_0,$$

$$q_{desir} = w_{bright}(q_{basic}), \quad q_0 < q_{basic} \leq \max Q, \quad (2b)$$
where
$$\alpha(q) = \frac{q}{q_0}$$

for some fixed quantile $q_0$. The lower $q_0$ is chosen, the more the bright quantiles contribute to the desired quantiles. The desired quantile together with its corresponding cumulative probability forms a guidance number pair.

A map computer 600 constructs the mapping 1700 on the basis of the desired quantiles (2a), (2b). As it is based on the bright quantiles for bright spatial regions and predominantly on the dark quantiles for dark spatial regions, the mapping 1700 removes residual flicker for both high and low brightness as it reduces the resolution in these regions. Since residual flicker is less noticeable for dark regions, and since it is desirable to minimize the coarseness of the desired quantile scale, the dependency on the bright quantiles in bright spatial regions in (2a) and (2b) is stronger than the dependency on the dark quantiles in the dark spatial regions.

Figure 5:
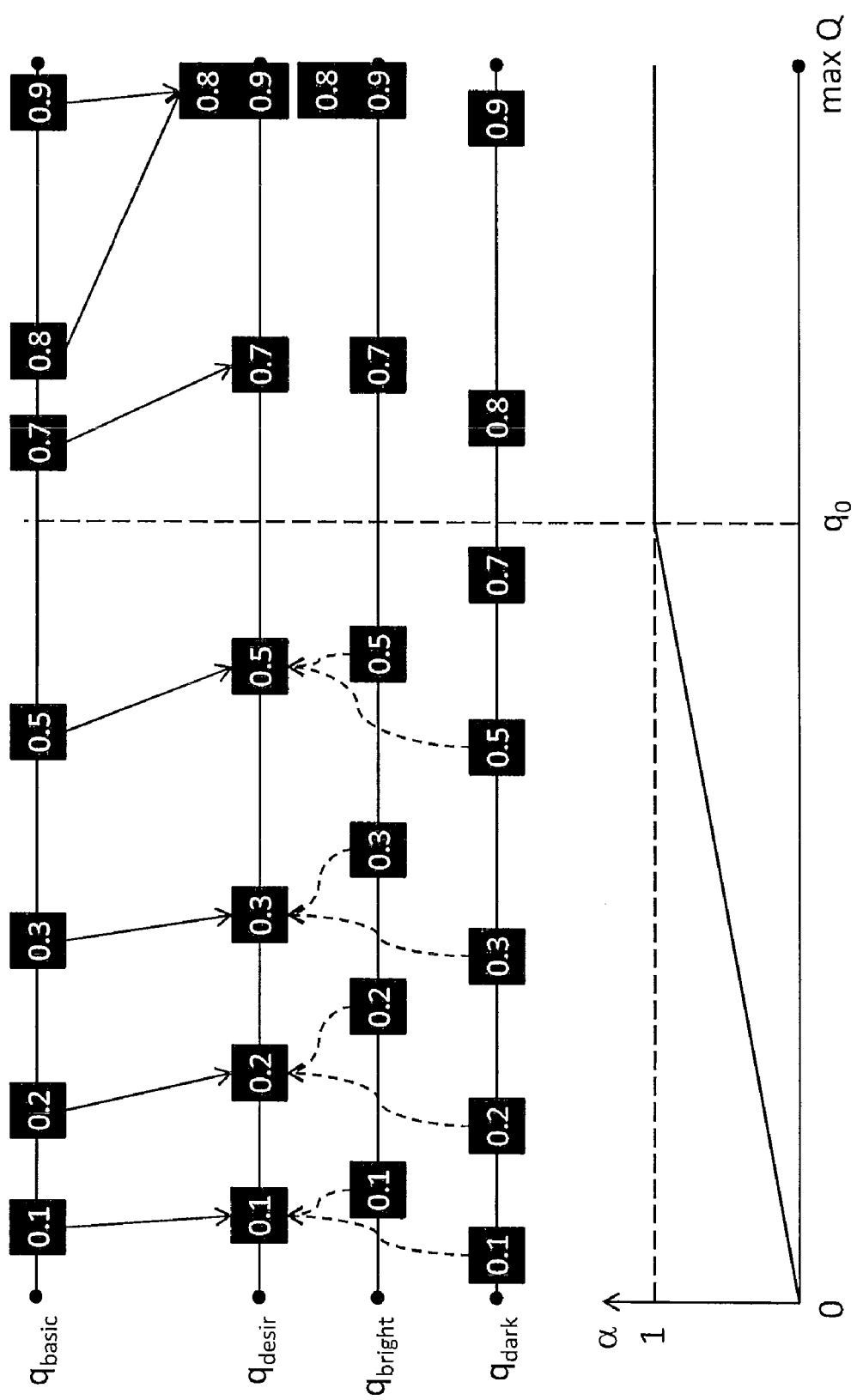
FIG. 5 shows the values of basic, desired, bright and dark quantiles in an exemplary case, as well as the function α, which will be introduced below.

FIG. 5 illustrates the desired quantiles given by (2a), (2b). The horizontal axis denotes quantile values from zero to max Q, and the sets of basic quantiles $q_{basic}$, desired quantiles $q_{desir}$, bright quantiles $q_{bright}$ and dark quantiles $q_{dark}$ are indicated on one line for each set and labeled with their corresponding cumulative probabilities. In the exemplary case shown in FIG. 5, there are seven basic quantiles. The corresponding cumulative probabilities are denser near the ends, 0 and 1, for this is where non-resolution of image features is most likely to occur and also where the highest sensitivity is needed. Below the quantiles, the function $\alpha(q)$ is traced. For quantiles greater than $q_0$—in the present case, this is the quantiles for cumulative probabilities 0.7, 0.8 and 0.9—the desired quantiles are equal to the corresponding bright quantiles. Clearly, the two highest quantiles are equal to max Q, the 1.0-quantile, and no image features between $q_{basic}$ (t, 0.8) and max Q are resolved in the corrected frame. Below $q_0$, the desired quantiles are obtained by interpolation between bright and dark quantiles, e.g.:

$$q_{desir}(t,0.1) = (1-\alpha(q_{basic}(t,0.1)))w_{dark}(q_{basic}(t,0.1)) + \alpha(q_{basic}(t,0.1))w_{bright}(q_{basic}(t,0.1))$$

Because of the properties of the function $\alpha(q)$, the contribution from the dark quantiles is most important near 0. As has already been mentioned, the mapping 1700 can be constructed by linear interpolation between the basic quantiles. Accordingly, the quantile $$\beta q_{basic}(t,P_1) + (1-\beta)q_{basic}(t,P_2),$$

where $0 < \beta < 1$ and $P_1, P_2 \beta P^*$ are adjacent cumulative probabilities, is mapped to $$\beta q_{desir}(t,P_1) + (1-\beta)q_{desir}(t,P_2).$$

While the invention has been illustrated and described in detail in the drawings and foregoing description, such illustration and description are to be considered illustrative or exemplary and not restrictive; the invention is not limited to the disclosed embodiments. In particular, the bright and dark quantiles may be defined in a different manner to fulfill specific purposes and the interpolation used for replacing quantiles is not necessarily linear. Further, it is understood that some components that are included in the disclosed embodiments are optional.

Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measures cannot be used to advantage. Any reference signs in the claims should not be construed as limiting the scope.

The invention claimed is:

1. A method for suppressing an undesired temporal pixel-value variation in a time sequence of video frames, the method including the steps of:
   computing, on the basis of values of a predetermined subset of pixels in each video frame in the time sequence, a set of number pairs of cumulative probabilities and corresponding quantiles, thereby yielding a sequence of sets of number pairs;
   determining, on the basis of the sequence of sets of number-pairs, guidance number pairs of cumulative probabilities and corresponding quantiles, wherein the guidance number pairs include a dark guidance pair and a bright guidance pair, at least one of the dark guidance pair or the bright guidance pair including two or more quantiles that include resolved and unresolved image features; and
   replacing actual pixel values in the most recent frame in the time sequence by corrected pixel values in accordance with the two or more quantiles,
   wherein the two or more quantiles are determined in such a manner that, responsive to one or more image features being resolved in a first other frame of the time sequence and unresolved in a second other frame of the time sequence, said one or more image features are unresolved in the first other frame and unresolved in the second other frame after the step of replacing the actual pixel values.

2. A method according to claim 1, wherein:
   the pixel-value variation is periodic; and
   the most recent frame, the first other frame and the second other frame are located within one period of the pixel-value variation.

3. A method according to claim 1, wherein the set of guidance number pairs and each set of number pairs are matched in cumulative probability.

4. A method according to claim 3, wherein the set of number pairs, evaluated for the most recent frame, describe the actual pixel values to be replaced in the same manner as the guidance number pairs describe the corrected pixel values.

5. A method according to claim 3, wherein the step of replacing is carried out in accordance with a monotonic mapping such that the quantile of each number pair computed for the most recent frame is mapped to the corresponding quantile of a matching guidance number pair.

6. A method according to claim 5, wherein any quantile comprised between quantiles of two adjacent number pairs is mapped to a value obtained by interpolation between quantiles of matching guidance number pairs.

7. A method according to claim 3, wherein the guidance number pairs are determined in such manner that quantiles of two or more guidance number pairs substantially coincide responsive to the same quantiles coinciding in any of the sets of number pairs.

8. A method according to claim 3, wherein the quantile of a guidance number pair is based on one or more of:
- a minimum of the quantiles of matching number pairs in the sequence,
- a median of the quantiles of matching number pairs in the sequence, and or
- a maximum of the quantiles of matching number pairs in the sequence.

9. A method according to claim 1, wherein said predetermined subset of pixels is a proper subset of the frame.

10. A computer-program product comprising instructions stored on a non-transitory computer-readable medium which when executed on a general-purpose computer performs the method of claim 1.

11. A device for suppressing an undesired temporal pixel-value variation in a sequence of video frames, the device comprising:
- a first processing means for computing, on the basis of values of a predetermined subset of pixels in each video frame in the time sequence, a set of number pairs of cumulative probabilities and corresponding quantiles, thereby yielding a sequence of sets of number pairs;
- a buffer for storing the sequence of sets of number pairs;
- a second processing means for determining, on the basis of the sequence of sets of number pairs, guidance number pairs of cumulative probabilities and corresponding quantiles, wherein the guidance number pairs include a dark guidance pair and a bright guidance pair, at least one of the dark guidance pair or the bright guidance pair including two or more quantiles that include resolved and unresolved image features; and
- a corrector for replacing actual pixel values in the most recent frame in the time sequence by corrected pixel values in accordance with the two or more quantiles,
- wherein the two or more quantiles are determined in such manner that, responsive to one or more image features being resolved in a first other frame of the time sequence and unresolved in a second other frame of the time sequence, said one or more image features are unresolved in the first other frame and unresolved in the second other frame after the corrector replaces the actual pixel values.

12. A device according to claim 11, wherein the second processing means is adapted to determine a set of guidance number pairs which are matched in cumulative probability to each set of number pairs.

13. A device according to claim 12, wherein the corrector is adapted to replace actual pixel values in the most recent frame in the time sequence in accordance with a monotonic mapping such that the quantile of each number pair computed for the most recent frame is mapped to the corresponding quantile of a matching guidance number pair.

14. A device according to claim 12, wherein the second processing means is adapted to determine the guidance number pairs in such manner that quantiles of two or more guidance number pairs substantially coincide responsive to the same quantiles coinciding in any of the sets of number pairs.

15. A device according claim 12, wherein the second processing means is adapted to determine the quantile of a guidance number pair based on one or more of:
- a minimum of the quantiles of matching number pairs in the sequence,
- a median of the quantiles of matching number pairs in the sequence, or
- a maximum of the quantiles of matching number pairs in the sequence.

16. A method according to claim 2, wherein the set of guidance number pairs and each set of number pairs are matched in cumulative probability.

17. A method according to claim 4, wherein the step of replacing is carried out in accordance with a monotonic mapping such that the quantile of each number pair computed for the most recent frame is mapped to the corresponding quantile of a matching guidance number pair.

18. A method according to claim 4, wherein the guidance number pairs are determined in such manner that quantiles of two or more guidance number pairs substantially coincide responsive to the same quantiles coinciding in any of the sets of number pairs.

19. A method according to claim 5, wherein the guidance number pairs are determined in such manner that quantiles of two or more guidance number pairs substantially coincide responsive to the same quantiles coinciding in any of the sets of number pairs.

20. A method according to claim 6, wherein the guidance number pairs are determined in such manner that quantiles of two or more guidance number pairs substantially coincide responsive to the same quantiles coinciding in any of the sets of number pairs.

* * * * *